United States Patent
Kiyohara et al.

(10) Patent No.: US 6,665,571 B2
(45) Date of Patent: Dec. 16, 2003

(54) METHOD FOR SELECTING A CONTAINER MODEL FOR COMPONENT PARTS

(75) Inventors: Nobuyoshi Kiyohara, Tokyo (JP); Yoshihei Iwai, Tokyo (JP); Makoto Arai, Tokyo (JP); Tatsuo Koyama, Tokyo (JP); Hidekazu Takahashi, Tokyo (JP); Yoshinori Kuroda, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/224,337

(22) Filed: Aug. 21, 2002

(65) Prior Publication Data

US 2003/0061175 A1 Mar. 27, 2003

(30) Foreign Application Priority Data

Sep. 26, 2001 (JP) .......................................... 2001-293100

(51) Int. Cl.[7] .............................................. G06F 19/00
(52) U.S. Cl. .......................................... 700/99; 705/28
(58) Field of Search ..................... 700/106, 99; 705/28, 705/29, 22

(56) References Cited

U.S. PATENT DOCUMENTS

| | | | | | |
|---|---|---|---|---|---|
| 4,669,047 | A | * | 5/1987 | Chucta | 700/113 |
| 4,773,807 | A | * | 9/1988 | Kroll et al. | 414/282 |
| 6,549,891 | B1 | * | 4/2003 | Rauber et al. | 705/25 |
| 6,587,748 | B2 | * | 7/2003 | Baack | 700/237 |

* cited by examiner

Primary Examiner—Albert W. Paladini
(74) Attorney, Agent, or Firm—Arent Fox Kintner Plotkin & Kahn, PLLC (57) ABSTRACT

A method for selecting a container model for component parts capable of selecting the most profitable, optimum container model for component parts such as vehicle component parts is provided. After calculating the total expenses of all different container models, the method selects the most inexpensive, optimum container model by comparing the total expenses in predetermined years thus calculated with each other and with the total expense in predetermined years of a disposable container.

3 Claims, 6 Drawing Sheets

| ITEM NUMBER | DEMAND QUANTITY | | PROTOTYPE CONTAINER UNIT PRICE | | | PER-USE CONTAINER RECOVERY EXPENSE |
|---|---|---|---|---|---|---|
| | ANNUAL | MONTHLY | BLACK CORRUGATED CONTAINER | CHEMICALLY REINFORCED CONTAINER | PP CONTAINER | |
| 1 | 2,204 | 184 | 1,781 | 1,903 | 3,842 | 400 |
| 2 | 1,250 | 104 | 1,865 | 2,156 | 4,024 | 400 |
| 3 | 1,023 | 85 | 1,895 | 2,035 | 4,028 | 400 |
| 4 | 855 | 71 | 1,581 | 2,156 | 4,024 | 400 |
| 5 | 640 | 53 | 1,384 | 1,485 | 3,137 | 400 |
| 6 | 527 | 44 | 1,581 | 1,683 | 3,489 | 400 |
| 7 | 265 | 22 | 1,673 | 1,804 | 3,628 | 400 |
| 8 | 230 | 19 | 1,918 | 2,035 | 4,065 | 400 |
| 9 | 230 | 19 | 1,860 | 1,991 | 3,830 | 400 |
| 10 | 226 | 19 | 1,860 | 1,991 | 2,830 | 400 |
| 11 | 146 | 12 | 1,581 | 1,683 | 3,489 | 400 |
| TOTAL | 7,596 | 633 | | | | |

(IN YEN)

Fig.3B

(IN THOUSAND YEN)

| ITEM NUMBER | ANNUAL CONTAINER PURCHASE EXPENSE | | | | ANNUAL CONTAINER RECOVERY EXPENSE | | |
|---|---|---|---|---|---|---|---|
| | BLACK CORRUGATED CONTAINER | CHEMICALLY REINFORCED CONTAINER | PP CONTAINER | | BLACK CORRUGATED CONTAINER | CHEMICALLY REINFORCED CONTAINER | PP CONTAINER |
| | | | INITIAL YEAR | NEXT YEAR | | | |
| 1 | 1,963 | 1,049 | 1,411 | 42 | 441 | 661 | 808 |
| 2 | 1,166 | 674 | 838 | 25 | 250 | 375 | 458 |
| 3 | 969 | 520 | 687 | 21 | 205 | 307 | 375 |
| 4 | 676 | 461 | 573 | 17 | 171 | 257 | 314 |
| 5 | 443 | 238 | 335 | 10 | 128 | 192 | 235 |
| 6 | 417 | 222 | 306 | 9 | 105 | 158 | 193 |
| 7 | 222 | 120 | 160 | 5 | 53 | 80 | 97 |
| 8 | 221 | 117 | 156 | 5 | 46 | 69 | 84 |
| 9 | 214 | 114 | 147 | 4 | 46 | 69 | 84 |
| 10 | 210 | 112 | 107 | 3 | 45 | 68 | 83 |
| 11 | 115 | 61 | 85 | 3 | 29 | 44 | 54 |
| TOTAL | 6,615 | 3,688 | 4,805 | 144 | 1,519 | 2,279 | 2,785 |

Fig.3C (IN THOUSAND YEN)

| ITEM NUMBER | SIX-YEAR TOTAL EXPENSE | | | | EXISTING CORRUGATED CONTAINER | | TOTAL EXPENSE |
|---|---|---|---|---|---|---|---|
| | BLACK CORRUGATED CONTAINER | CHEMICALLY REINFORCED CONTAINER | PP CONTAINER | | UNIT PRICE (YEN) | ANNUAL PURCHASE EXPENSE | |
| 1 | 14,421 | 10,259 | 6,472 | | 853 | 1,880 | 11,280 |
| 2 | 8,494 | 6,293 | 3,714 | | 1,078 | 1,348 | 8,085 |
| 3 | 7,043 | 4,964 | 3,040 | | 974 | 996 | 5,978 |
| 4 | 5,081 | 4,304 | 2,540 | | 1,078 | 922 | 5,530 |
| 5 | 3,425 | 2,578 | 1,793 | | 605 | 387 | 2,323 |
| 6 | 3,132 | 2,279 | 1,512 | | 583 | 307 | 1,843 |
| 7 | 1,648 | 1,194 | 767 | | 617 | 164 | 981 |
| 8 | 1,599 | 1,116 | 685 | | 920 | 212 | 1,270 |
| 9 | 1,559 | 1,101 | 675 | | 1,183 | 272 | 1,633 |
| 10 | 1,532 | 1,082 | 620 | | 1,183 | 267 | 1,604 |
| 11 | 868 | 631 | 419 | | 583 | 85 | 511 |
| TOTAL | 48,803 | 35,800 | 22,237 | | | 6,840 | 41,038 |

METHOD FOR SELECTING A CONTAINER MODEL FOR COMPONENT PARTS

BACKGROUND OF THE INVENTION

1. Field of the Invention

This invention relates to a method for selecting an optimum type of containers for packaging component parts of vehicles, for example.

2. Description of the Related Art

Component parts, and the like, of vehicles were usually contained in corrugated containers, and specific parts were sometimes contained in semipermanently durable containers.

Corrugated containers are disposable containers that are used only once and disposed thereafter, and annual expense for corrugated containers is fixed in accordance with annual demand of component parts. Therefore, as far as corrugated containers are used, improvement of commercial profit is not expected.

On the other hand, semipermanently durable containers are expensive. Nevertheless, if component parts themselves are changed in shape due to a model change, for example, such durable containers will become unusable and will result in being uneconomical.

For some kinds of component parts, the use of containers durable over a certain number of repetitive use may become economical in a long run even though their unit cost is higher than corrugated containers. Additionally, when a possible change of the shape of component parts is taken into consideration, such containers may be economical than semipermanently durable containers.

It is therefore an object of the invention to provide a method for selecting a container model for component parts, capable of selecting a most profitable, optimum container model for a particular item of component parts.

SUMMARY OF THE INVENTION

According to the invention, there is provided a method for selecting a container for component parts comprising the steps of:

setting a prototype container unit price, a per-unit container recovery expense, an annual purchase frequency, a durable period and an annual demand quantity for each of various container models other than a disposable container model for a specific component part;

in case that said container has a durable period shorter than one year, calculating the annual container purchase expense on the basis of the annual demand quantity, the annual purchase frequency and the prototype container unit price;

calculating an annual container recovery expense on the basis of said annual demand quantity, the container recovery expense and the annual purchase frequency thereof; and calculating a total expense of the container having a durable period shorter than one year in predetermined years on the basis of the annual container purchase expense and said annual container recovery expense thereof, in case that the container has a durable period not shorter than one year;

calculating an initial-year container purchase expense on the basis of the annual demand quantity and the prototype container unit price thereof;

calculating a next-year container purchase expense on the basis of the annual demand quantity, the prototype container unit price and an annual supplementary rate thereof;

calculating the annual container recovery expense on the basis of the annual demand quantity and the container recovery expense; and calculating a total expense in the predetermined years of the container having a durable period not shorter than one year on the basis of the initial-year container purchase expense, the next-year container purchase expense and the annual container recovery expense;

repeating calculation of total expenses of the others of the container models; and selecting optimum one of the container models having the least total expenses in the predetermined years among calculated the total expenses in the predetermined years and the total expense in the predetermined years of the disposable container.

This method enables computation of the total expenses in predetermined years of various container models other than disposable container models such that a most economical, optimum container model can be selected by comparing the total expenses in predetermined years including those of disposable containers.

Therefore, by comparing the total expenses in predetermined years, it is possible to find out a container model more commercially profitable than disposable containers and more economical than semipermanently durable containers.

The computation may result in indicating a disposable container as the most inexpensive, optimum container model for a particular part.

In the method for selecting a container model for component parts, the component parts to be contained in the container may be a vehicle component parts, and the predetermined years may be six years from the first to sixth years.

Vehicles are usually changed in model every three to four years. According to the past data, operation attenuation rates of vehicle component parts tend to rapidly drop as from the fifth year. Therefore, expenses required for containers from the first year, where new component parts are first purchased, to the sixth year, which is next to the year where their operation attenuation rates begin to rapidly lower, indicate most actual expenses of containers of vehicle components parts.

In the method for selecting a container model for component parts, the annual supplementary rate is preferably 0.03. More specifically, in case of a container model whose life exceeds one year, it is reasonable in view of the average of the past records to determine that the annual supplementary rate that indicates the rate of supplementation required by the next year due to breakage and others is 0.03 (3%).

DESCRIPTION OF THE PREFERRED EMBODIMENTS

An embodiment of the invention will now be explained below with reference to FIGS. 1 through 3C.

The operation of selecting a container model for component parts according to the embodiment is an application to containers of vehicle component parts, and it is executed by a computer 1.

Figure 1:
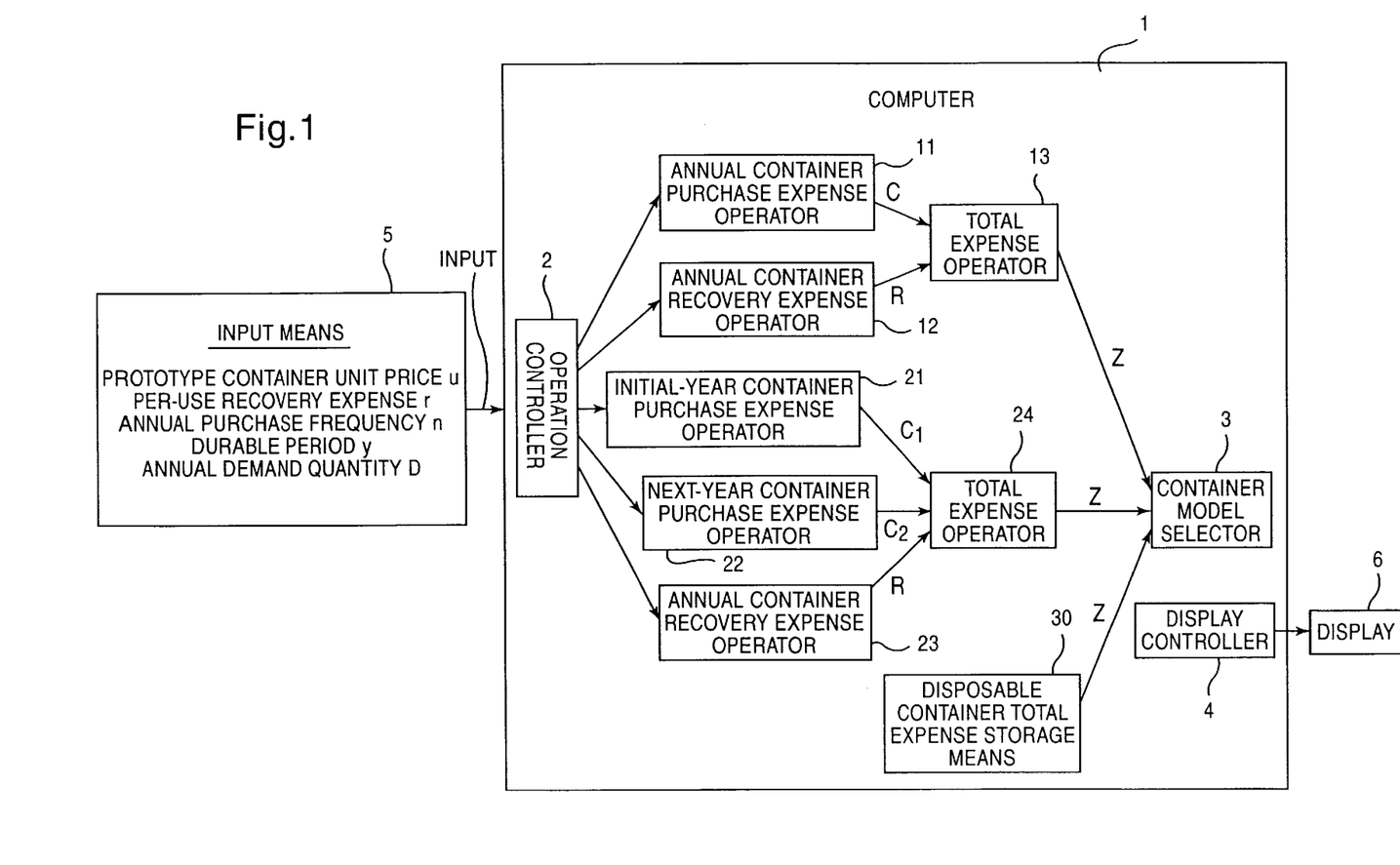
FIG. 1 is a functional block diagram of a computer-aided control system of a method for selecting a container model for component parts according to an embodiment of the invention.

FIG. 1 shows a functional block diagram of the control system by the computer 1.

The computer 1 includes an operation control means 2 that introduces various data from an input means 5 and deliver respective data to respective operating means.

The Input data introduced by the input means 5 include the unit price u of a prototype of each container model of a vehicle component part, per-use recovery expense r, annual purchase frequency n, durable period y, and annual demand quantity D, among others.

Operating means include an annual container purchase expense operating means 11 for computing the annual container purchase expense C of each container model having a durable period shorter than one year, an annual container recovery expense operating means 12 for computing each annual container recovery expense R, and a total expense operating means 13 for computing the total expense Z of in the period of predetermined years (six years) based on the results of those computations. For containers having durable periods longer than one year, the operating means further include an initial-year container purchase expense operating means 21 for computing the initial-year container purchase expense $C_1$, a next-year container purchase expense operating means 22 for computing the next-year container purchase expense $C_2$, an annual container recovery expense operating means for computing the annual container recovery expense R, and a total expense operating means 24 for computing the total expense Z of predetermined years (six years) based on the results of those computations.

The total expense of each specific container model (other than disposable containers) of a particular component part is calculated by those operating means 11, 12, 13, 21, 22, 23, 24.

The computer 1 further includes a disposable container total expense storage means 30 for storing the unit price of each disposable container (corrugated container) and its total expense Z of predetermined years (six years).

Furthermore, the computer 1 includes a container model selecting means 3 for selecting the model having the smallest one of the total expenses Z calculated on various container models for a particular component part and the total expenses Z of disposable containers stored in the disposable container total expense storage means 30. The computer 1 also includes a display control means 4 for controlling a display means 6 to display the results of those operations.

Figure 2:
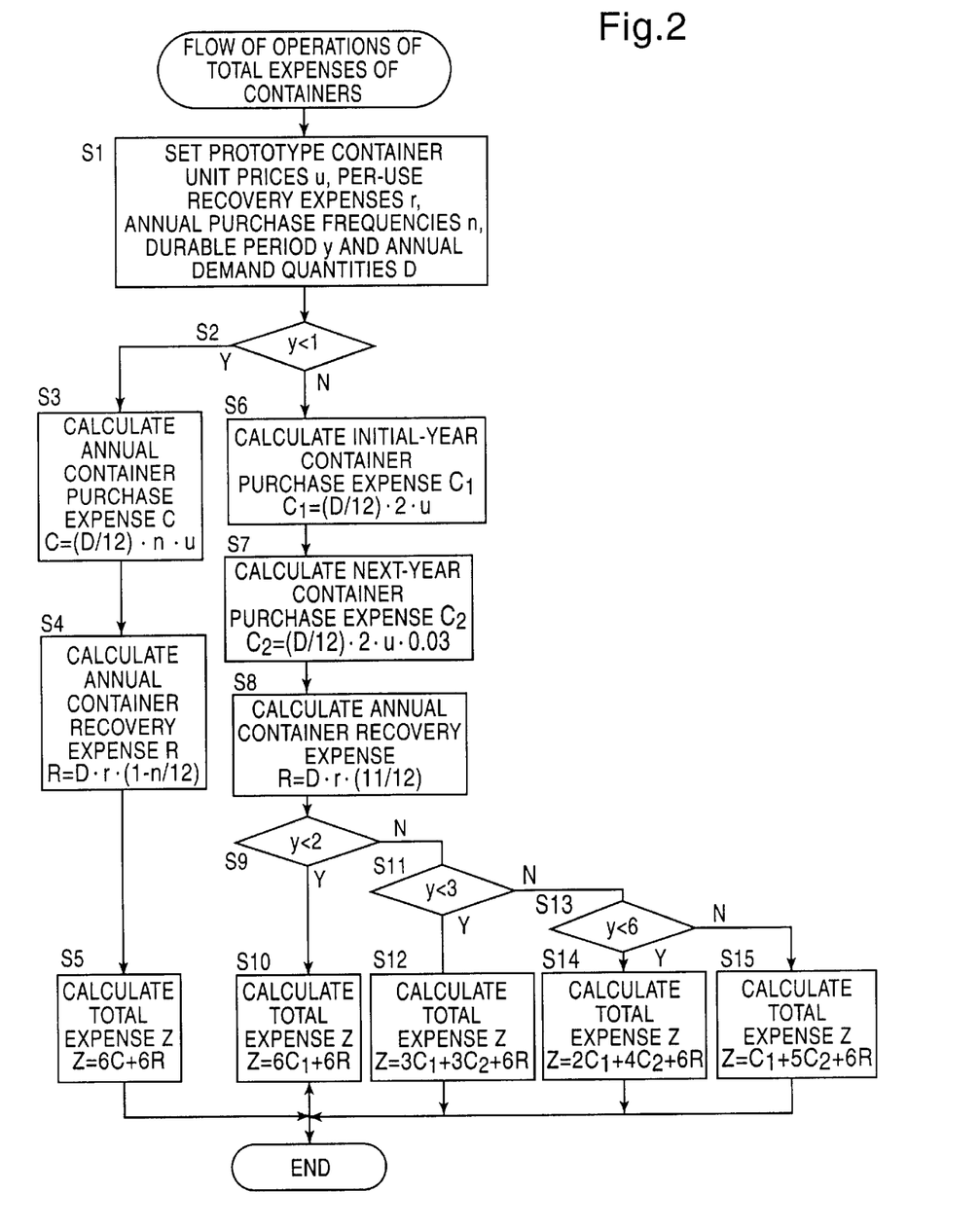
FIG. 2 is a flow chart showing operation procedures by the control system.

Procedures of operations for calculating total expenses Z of predetermined years (six years) of a certain container model are shown in the flow chart of FIG. 2, and will be explained following to the flow chart.

For a certain container model, the unit price u of its prototype container, per-use recovery expense r, annual purchasing frequency n, durable period y, and annual demand quantity D are first set up according to inputs (step 1).

Subsequently, it is determined whether the durable period y already set is shorter than one year or not (step 2). If it is shorter than one year, the flow goes to step 3 to compute the annual container purchase expense C in the annual container purchase expense operating means 11.

The annual container purchase expense C of a container model whose durable period is shorter than one year can be obtained by obtaining the monthly demand quantity by dividing the annual demand quantity D by 12, and then multiplying the monthly demand quantity by the annual purchase frequency n and the prototype container unit price u.

That is, annual container purchase expense C is $C=(D/12) \cdot n \cdot u$.

In the next step 4, the annual container recovery expense R is computed in the annual container recovery expense operating means 12.

The annual container recovery expense R is calculated by multiplying the annual demand quantity D by the per-use recovery expense r and the annual recovery frequency ratio $(1-n/12)$.

That is, the annual container recovery expense R is $R=D \cdot r \cdot (1-n/12)$.

Note that the annual recovery frequency ratio is the ratio of twelve months minus the months other than the annual purchase frequency n, namely $(12-n)$, relative to twelve months, namely $(12-n)/12 = 1-n/12$.

Vehicles are usually changed in model every three to four years, and according to the past data, operation attenuation rates of vehicle component parts tend to rapidly drop as from the fifth year. Therefore, in the next step 5, calculation is carried out to obtain the total expense Z required for the container from the first year, where new component parts are first purchased, to the sixth year, which is next to the year where the operation attenuation rate begins to rapidly lower.

That is, from the annual container purchase expense C and the annual container recovery expense R calculated in the preceding steps 3 and 4, the total expense z becomes $Z=6C+6R$ (step 5).

As such, for containers having durable periods y shorter than one year, the six-year total expenses Z are calculated following to the steps 3, 4 and 5.

Containers whose durable periods y are not shorter than one year are discriminated in step 2, and the flow goes to step 6. In step 6, the initial-year container purchase expense $C_1$ is calculated in the initial-year container purchase expense operating means 21.

As to a container model whose durable period is one year or longer, the annual purchase frequency y is determined as 2, taking its recovery into consideration, and the initial-year container purchase expense $C_1$ can be obtained by multiplying the monthly demand quantity (D/12) by the annual purchase frequency 2 and the prototype container unit price u. That is, the initial-year container purchase expense $C_1$ is $C_1=(D/12) \cdot 2 \cdot u$.

In the next step 7, the next-year container purchase expense $C_2$ is calculated in the next-year container purchase expense operating means 22. The next-year container purchase expense $C_2$ of a container whose durable period is one year or longer corresponds to the expense of supplement for broken containers, and it is calculated by multiplying the initial-year container purchase expense $C_1$ by the annual supplementary rate.

The annual supplementary rate is determined as 0.03 (3%) on the basis of the average of the past records.

In the next step 8, the annual container recovery expense R is computed in the annual container recovery expense operating means 23.

Annual recovery expense of a container model having a one-year or longer durable period is calculated by assuming the month of new purchase of the containers to be a month not requiring recovery and therefore multiplying the annual ratio 11/12 excluding one month from a year by the product of the annual demand quantity D and the per-use recovery expense r. That is, the annual container recovery expense R is $R-D=r=(11/12)$ (step 8).

Once the initial-year container purchase expense $C_1$, next-year container purchase expense $C_2$ and annual container recovery expense R are calculated, the flow progresses to step 9 to determine whether the durable period y is shorter than two years or not. If it is shorter than two years, the flow goes to step 10, and since the container model requires the initial-year container purchase expense $C_1$ and the annual container recovery expense R every year, its six-year total expense Z is calculated as $Z=6C_1+3C_2+6R$.

That is, as to a container model whose useful time in year y is not shorter than two years and shorter than three years, it requires the initial-year container purchase expense $C_1$ and the next-year container purchase expense C2 three times every six years, and its six-year total expense Z is calculated as $Z=3C_1+3C_2+6R$.

If the container model has a three-year or longer durable period y, the flow goes from step 11 to step 13 to determine whether the durable period y is shorter than six years or not. If it is shorter than six years, the flow goes to step 14, and the six-year total expense Z is calculated as $Z=2C_1+4C_2+6R$.

That is, for a container model whose durable period is not shorter than three years and shorter than six years, only two times of payment of the initial-year container purchase expense C1 and the remainder four times of payment of the next-year container purchase expense C2 are all of the purchase expense in the six-year period. Therefore, the six-year total expense Z is $Z=2C_1+4C_2+6R$.

In case of a container model whose durable period y is six years or longer, the flow goes from step 13 to step 15, and the six-year total expense Z is calculated as $Z=C_1+5C_2+6R$.

That is, for a container whose durable period y is longer than six years, only one time of payment of the initial-year container purchase expense $C_1$ and the remainder five times of payment of the next-year container purchase expense $C_2$ are all of the purchase expense in the six-year period. Therefore, the six-year total expense Z is $Z=C_1+5C_2+6R$.

Through the procedures explained above, six-year total expenses Z are calculated for individual container models.

On the other hand, corrugated containers currently used as part-containers for containing vehicle component parts are disposable, and their unit prices are already known in association with specific component parts. Therefore, the annual purchase expense of each corrugated container model can be calculated by multiplying its unit price by the annual demand quantity, and its six-year total expense is six times thereof.

Six-year total expenses of corrugated container models huts obtained are stored in the disposable container total expense storage means 30.

As to container models for certain times of repetitive use other than disposable container models, by calculating six-year total expenses by operations following to the flowchart and by comparing them and total expenses of corrugated container models, the most inexpensive, optimum container model can be selected for each specific component part.

For some actual vehicle component parts, expenses of three kinds of containers, namely, a black corrugated container reinforced than normal corrugated containers, chemically reinforced container (container reinforced by chemically processing a corrugated container) and PP container (resin container) are operated, and they are compared with each other and also with corrugated containers.

The annual purchase frequency of the black corrugated container is six times, that of the chemically reinforce container is three times, and that of the PP container is two times. The durable periods of the black corrugated container and the chemically reinforced container are shorter than one year, and that of the PP container is not shorter than six years.

Figure 3A:
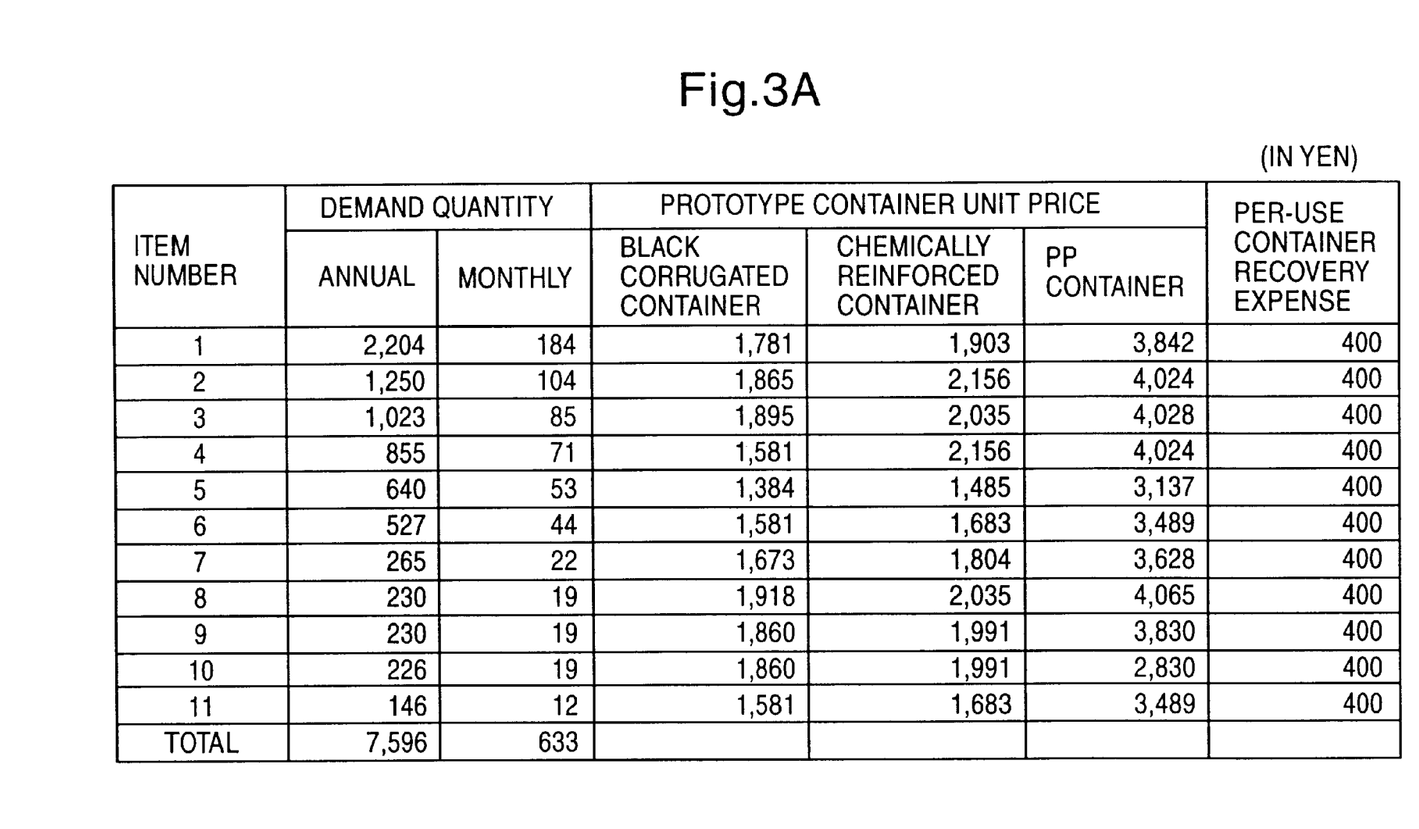
FIGS. 3A, 3B and 3C are tables that show various results of computations according to the flow chart in conjunction with the embodiment.

The table of FIG. 3A shows demand quantities (annual and monthly), prototype container unit prices (black corrugated containers, chemically reinforced containers, PP containers) and per-use container recovery expenses of different component parts ranked from 1 to 11 in the order of the largest to smallest demand quantities.

The prototype container unit price rises in the order of the black corrugated container, chemically reinforced container and PP container. The per-use container recovery expense is constantly 400 yen for all component parts and container models.

Figure 3B:
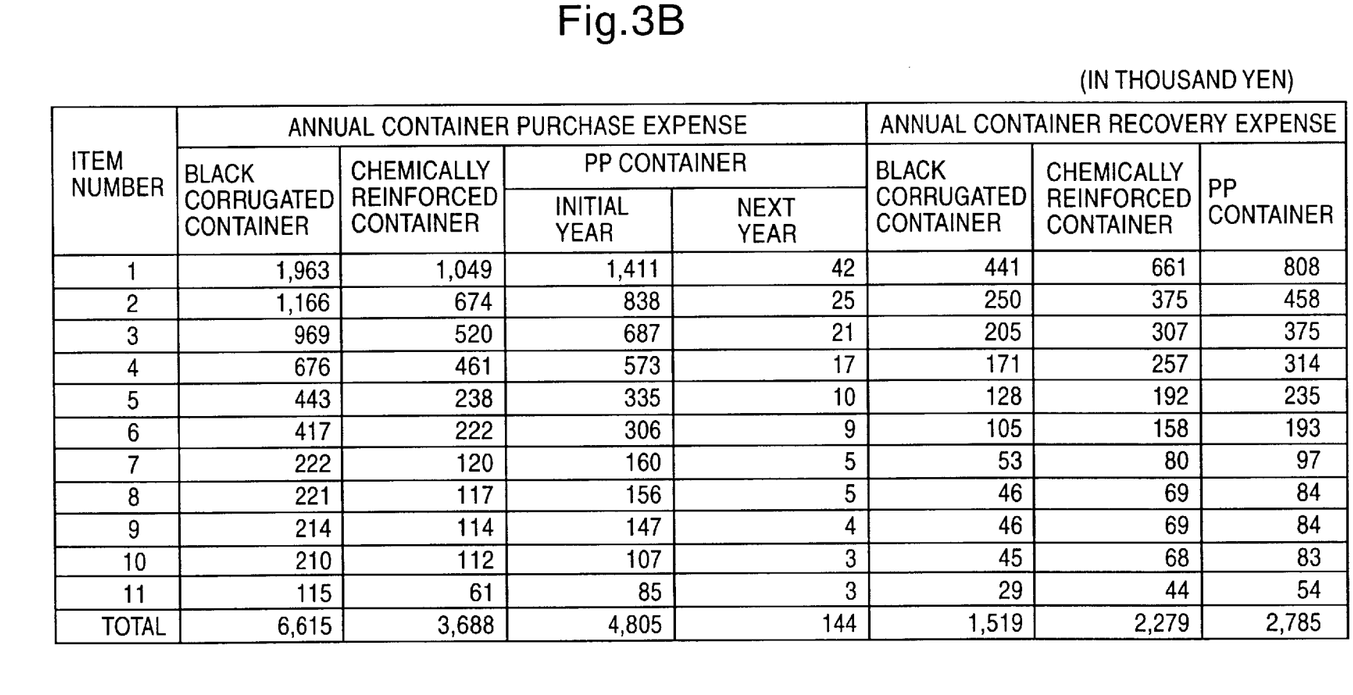

The table of FIG. 3B shows annual container purchase expenses C, $C_1$, $C_2$, and annual container recovery expenses R calculated for those three container models.

Figure 3C:
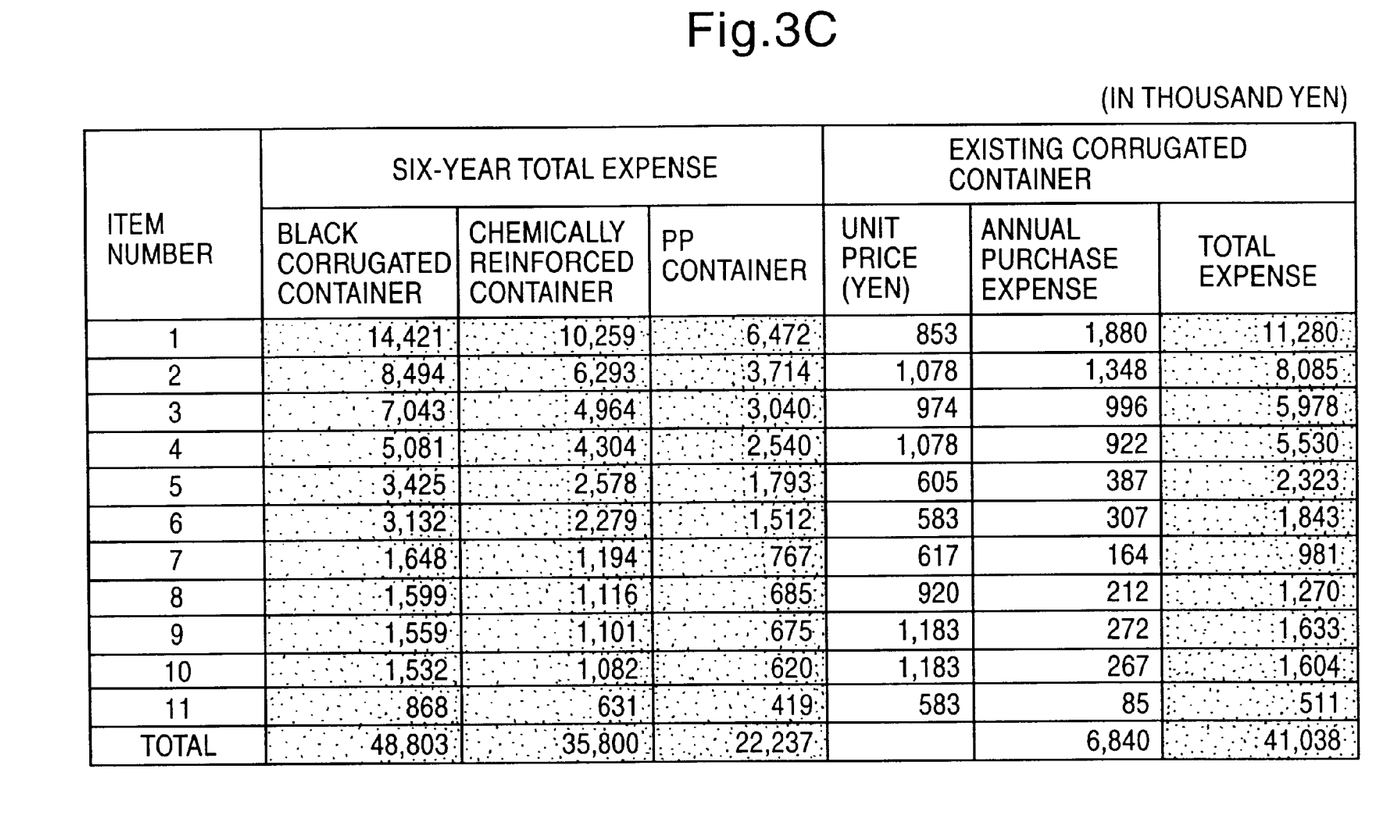

The table of FIG. 3C shows six-year total expenses Z of those three container models calculated from the annual container purchase expenses C, $C_1$, $C_2$, and the annual container recovery expenses R.

The table of FIG. 3C also shows unit prices of existing disposable corrugated containers, their annual purchase expenses and total expenses (for six years) for the comparison purposes.

Figure 4:
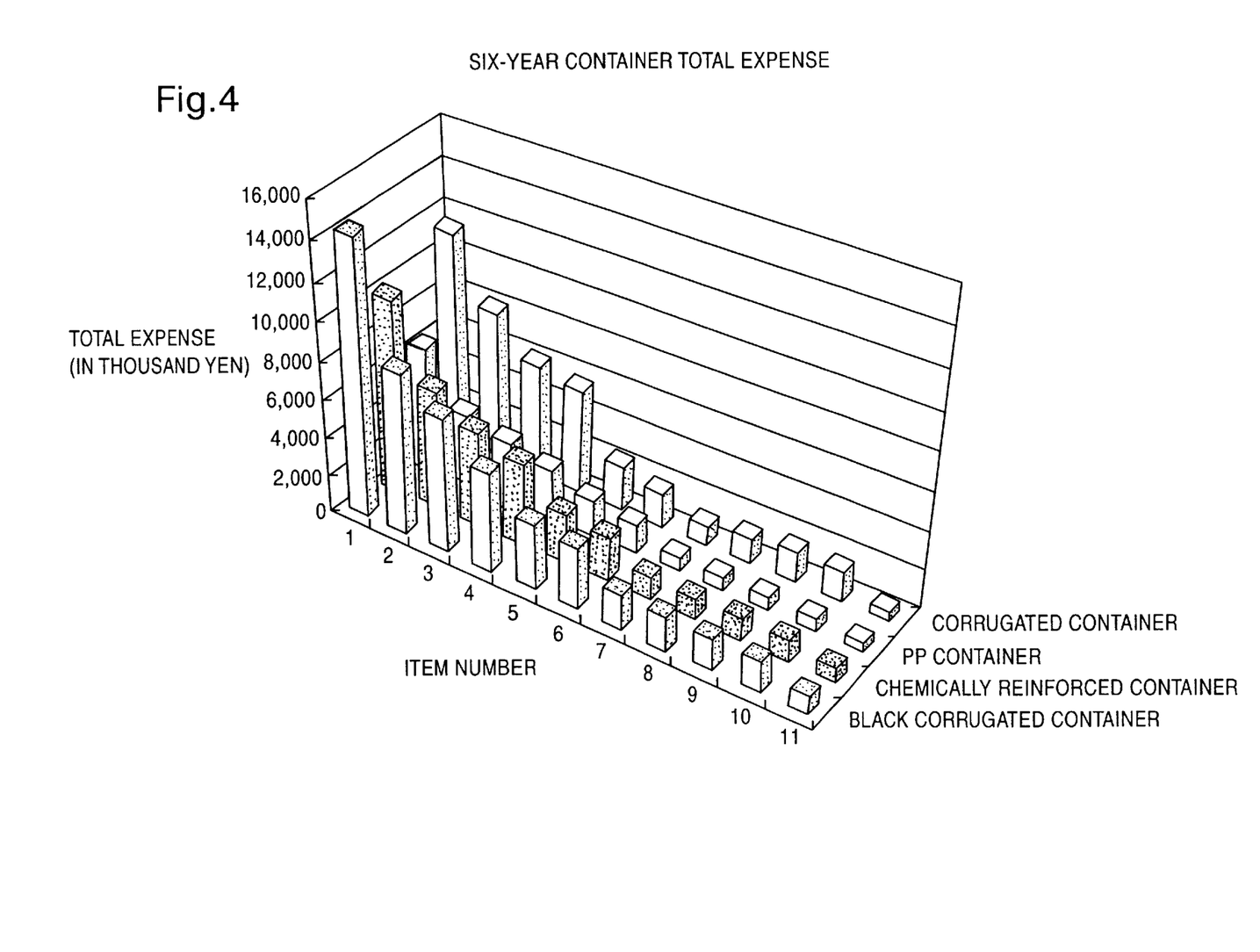
FIG. 4 is a diagram that shows six-year total expenses in conjunction with the same embodiment.

FIG. 4 is a bar chart for comparison of six-year total expenses of four container models, namely, black corrugated containers, chemically reinforced containers, PP containers and corrugated containers, on the basis of the table of FIG. 3C.

Among all component parts of all demand quantities numbered first to eleventh, the expenses become smaller in the order of black corrugated containers, chemically reinforced containers and PP containers. Especially, PP containers are always most inexpensive also when compared with corrugated containers, and it is appreciated from the six-year total expenses that PP containers having six-year or longer durable periods are most profitable, although their unit prices are higher.

When three container models other than PP containers are compared, chemically reinforced containers are inexpensive for component parts numbered 1 through 4 and 8 through 10, but existing corrugated containers are more profitable for the other component parts numbered 5 through 7 and 11.

As such, in regard to eleven kinds of vehicle component parts referred to above, most reasonable six-year total expenses can be calculated by operation for three container models, namely, black corrugated containers, chemically reinforced containers and PP containers, and by comparing them with each other and with total expenses of existing corrugated containers, it is possible to know that PP containers are most profitable for all of eleven kinds of component parts.

As such, efficiency of expenses for fabrication of part-containers can be enhanced, and their cost reduction can be realized. Workers may merely carry out simple jobs compiled in a manual, such as entry of values of prototype container unit prices through the input means.

Therefore, the invention facilitates flexible transaction on containers upon changes of shapes of component parts to more reliably keep the qualities of component parts during their transportation and storage. In addition, it is possible to standardize necessary jobs for selecting optimum part-containers and to enable a wider range of staffs to cope with the jobs.

What is claimed is:

1. A method for selecting a part-container comprising the steps of:

setting a prototype container unit price (u), a per-unit container recovery expense (r), an annual purchase frequency (n), a durable period (y) and an annual demand quantity (D) for each of various container models other than a disposable container model for a specific component part;

in case that said container has a durable period shorter than one year,
calculating the annual container purchase expense (C) on the basis of said annual demand quantity (D), said annual purchase frequency (n) and said prototype container unit price (u);
calculating an annual container recovery expense (R) on the basis of said annual demand quantity, said container recovery expense and said annual purchase frequency thereof; and
calculating a total expense (Z) of said container having a durable period shorter than one year in predetermined years on the basis of said annual container purchase expense (C) and said annual container recovery expense (R) thereof;

in case that said container has a durable period not shorter than one year,
calculating an initial-year container purchase expense ($C_1$) on the basis of said annual demand quantity (D) and said prototype container unit price (u) thereof;
calculating a next-year container purchase expense ($C_2$) on the basis of said annual demand quantity (D), said prototype container unit price (u) and an annual supplementary rate thereof;
calculating the annual container recovery expense (R) on the basis of said annual demand quantity and said container recovery expense; and
calculating a total expense (Z) in said predetermined years of said container having a durable period not shorter than one year on the basis of said initial-year container purchase expense ($C_1$), said next-year container purchase expense ($C_2$) and said annual container recovery expense (R);

repeating calculation of total expenses of the others of said container models; and selecting optimum one of said container models having the least total expenses in said predetermined years among calculated said total expenses in said predetermined years and the total expense in said predetermined years of said disposable container.

2. The method for selecting a container model for component parts according to claim 1 wherein said component parts are vehicle component parts, and said predetermined years are six years from the first to sixth years.

3. The method for selecting a container model for component parts according to claim 1 or 2 wherein said annual supplementary rate is 0.03.

* * * * *